United States Patent
Matsuoka

(10) Patent No.: US 12,235,521 B2
(45) Date of Patent: Feb. 25, 2025

(54) METHOD FOR DESIGNING SPECTACLE LENS, METHOD FOR MANUFACTURING SPECTACLE LENS, AND SYSTEM FOR DESIGNING SPECTACLE LENS

(71) Applicant: HOYA LENS THAILAND LTD., Pathumthani (TH)

(72) Inventor: Shohei Matsuoka, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 511 days.

(21) Appl. No.: 17/586,392

(22) Filed: Jan. 27, 2022

(65) Prior Publication Data
US 2022/0236591 A1    Jul. 28, 2022

(30) Foreign Application Priority Data
Jan. 27, 2021    (JP) .................. 2021-010740

(51) Int. Cl.
G02C 7/02    (2006.01)
G02C 7/06    (2006.01)

(52) U.S. Cl.
CPC ............. *G02C 7/027* (2013.01); *G02C 7/028* (2013.01); *G02C 7/06* (2013.01)

(58) Field of Classification Search
None
See application file for complete search history.

(56) References Cited

U.S. PATENT DOCUMENTS

2002/0196412 A1 * 12/2002 Abitbol .................... G02C 7/02
                                                                 351/219
2005/0259222 A1    11/2005 Kelch et al.
2018/0210228 A1     7/2018 Trumm et al.

FOREIGN PATENT DOCUMENTS

EP    1 262 815 A2    12/2002
JP        5096662 B2    12/2012
WO    2011/131679 A1    10/2011
WO    2012/008975 A1     1/2012

OTHER PUBLICATIONS

Jun. 24, 2022 extended Search Report issued in European Patent Application No. 22152320.2.

* cited by examiner

*Primary Examiner* — Darryl J Collins
(74) *Attorney, Agent, or Firm* — Oliff PLC

(57) ABSTRACT

A technology that makes a change in the amount of aberration in a spectacle lens worn by wearer relative to a change in at least one of the aberration in the eye or spectacle lens. A method for designing a spectacle lens wherein, when a degree of change caused by a physical feature of wearer in at least one of an aberration distribution of an eye of wearer and an aberration distribution of a spectacle lens worn by the wearer is large, a spectacle lens that has an aberration distribution of which rotational asymmetry is weak in a region having a predetermined width and a center at any point on a main meridian of the spectacle lens is obtained as a design solution, and when the degree of the change is small, a spectacle lens of which rotational asymmetry is strong in the region is obtained as a design solution.

19 Claims, 8 Drawing Sheets

FIG. 1C  Lens 1
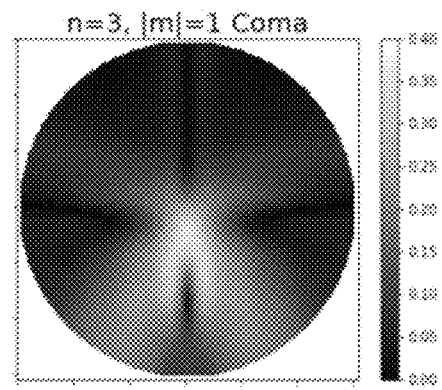
FIG. 1D  Lens 1
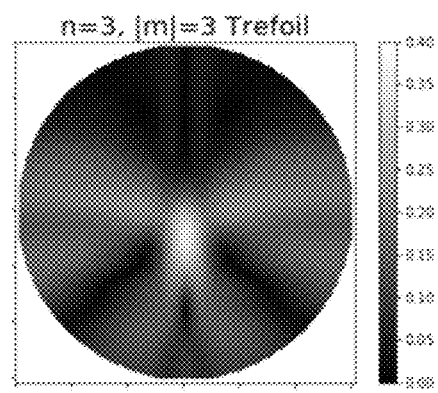

FIG. 2C Lens 2
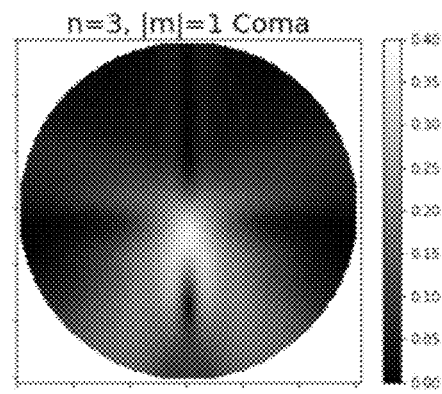
FIG. 2D Lens 2
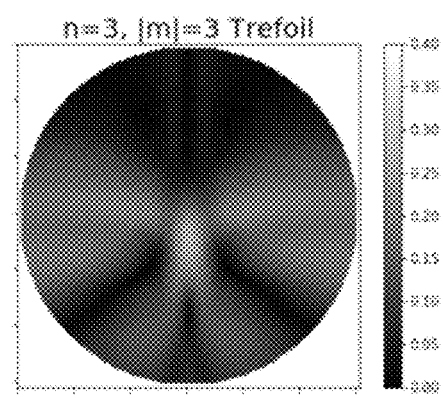

FIG. 3A Lens 3
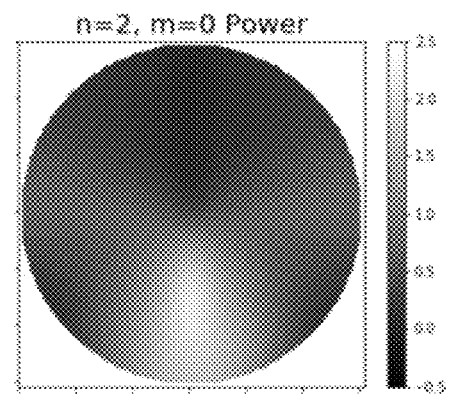
FIG. 3B Lens 3
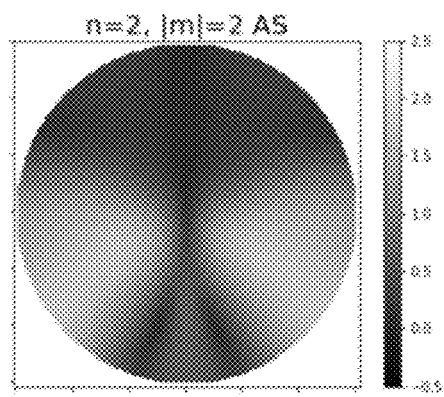

FIG. 3C Lens 3
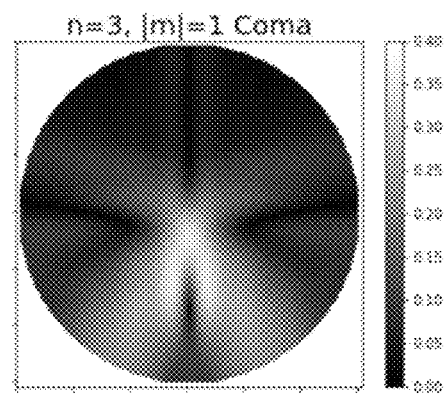
FIG. 3D Lens 3
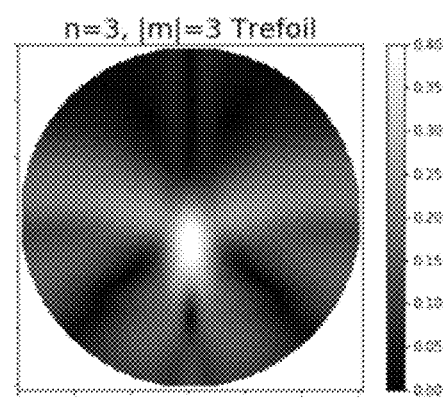

METHOD FOR DESIGNING SPECTACLE LENS, METHOD FOR MANUFACTURING SPECTACLE LENS, AND SYSTEM FOR DESIGNING SPECTACLE LENS

BACKGROUND OF THE INVENTION

1. Field of the Invention

The present invention relates to a method for designing a spectacle lens, a method for manufacturing a spectacle lens, and a system for designing a spectacle lens.

2. Description of Related Art

A method for manufacturing a lens that compensates aberrations of an eye of an ametropic person is known (JP 5096662B2). JP 5096662B2 describes correcting at least one higher order aberration in at least one direction of view.

JP 5096662B2 is an example of related art.

SUMMARY OF THE INVENTION

Aberrations of an eye of a wearer are compensated with a technology described in JP 5096662B2, which is a conventional technology. On the other hand, through intensive studies, the inventor of the present invention found that there is a risk that the compensation may not work effectively due to a physical feature of the wearer.

In a case where the physical feature is dry eye, for example, dry eye causes a change in the shape of a tear layer on the surface of a cornea, which will be described later in detail. Due to this change, an aberration distribution of the eye changes.

Also, in a case where the physical feature is a difference between heights of positions on left and right ears on which a spectacle frame is placed, for example, as the period of time for which the wearer has worn spectacles becomes longer, the position of the spectacles shifts from a right position about a rotation axis extending in the front-rear direction (optical axis direction) of the wearer, due to the difference between heights of positions on left and right ears on which the spectacle frame is placed. Due to this change, an aberration distribution of a spectacle lens changes.

In the present specification, aberration can be considered as being disturbance of a wavefront of light from an eye or a lens. When waves of which aberrations have opposite signs are combined, the aberrations are offset due to characteristics of waves. When waves of which aberrations do not have opposite signs are combined, the aberrations may be offset or may not be offset.

The present invention has an object of providing a technology that makes a change in the amount of aberration that is a combination of aberration in an eye of a wearer and aberration in a spectacle lens worn by the wearer robust relative to a change in at least one of the aberration in the eye and the aberration in the spectacle lens, even when the change occurs due to a physical feature of the wearer. In the present specification, "robust" means that even when the change occurs, when aberration in the eye and aberration in the spectacle lens are combined, the amount of aberration is less likely to change when compared to conventional cases.

The inventor of the present invention carried out intensive studies on the issues described above, and considered the following logic.

The inventor of the present invention observed and examined changes caused in aberration by physical features of people to make a relationship with a spectacle lens to be worn appropriate. At this time, the inventor found that most of the changes in aberration were caused by rotation of an aberration distribution. For example, a tear fluid on the cornea of a person often makes movement that is close to rotational movement. This is because of a phenomenon in which irregularities formed by the tear fluid in a peripheral portion of the cornea move downward due to gravity or positions (positions viewed from the center of the cornea) change due to blinking.

Therefore, the inventor focused on a change in an aberration distribution caused by rotation, and considered a relationship between this aberration distribution and an aberration distribution of a spectacle lens.

For example, assume that the spectacle lens has a rotationally symmetrical aberration distribution. In this case, even if the aberration distribution of the spectacle lens worn by a wearer is significantly changed by a physical feature of the wearer, the amount of aberration does not change when aberration in the eye of the wearer and aberration in the spectacle lens are combined. Similarly, even if an aberration distribution of the eye of the wearer is significantly changed by a physical feature of the wearer, the amount of aberration does not change when aberration in the eye of the wearer and aberration in the spectacle lens are combined.

Based on the above logic, the inventor found that, if the spectacle lens has an aberration distribution that is rotationally symmetrical or approximately rotationally symmetrical, even when the degree of a change caused by a physical feature of the wearer in at least one of the aberration distribution of the eye and the aberration distribution of the spectacle lens worn by the wearer is large, a change in the amount of aberration is small (i.e., robust) when aberration in the eye and aberration in the spectacle lens are combined.

Hereinafter, an aberration distribution that is far from being rotationally symmetrical will also be described as being "rotationally asymmetrical". In the present specification, a case where a distribution is very far from being rotationally symmetrical will be described as "rotational asymmetry is strong", and the opposite case, i.e., a case where a distribution is close to being rotationally symmetrical will be described as "rotational asymmetry is weak". Also, a "change in an aberration distribution" includes not only a change of the distribution itself, but also rotation of a predetermined distribution state about an axis or a shift of the distribution state.

That is, the inventor of the present invention conceived a technology that reduces a change in the amount of aberration that is a combination of aberration in the eye and aberration in the spectacle lens, by accepting and considering a change that occurs over time in aberration due to a physical feature of the wearer, rather than determining a wavefront of the spectacle lens such that maldistribution of aberration based on a wavefront of the eye is suppressed as in the conventional technology. Hereinafter, a "change that occurs over time" in aberration due to a physical feature of a wearer will be also simply referred to as a "change". This change includes a change that occurs as a result of the tear fluid gradually evaporating on the cornea and an instantaneous change caused by blinking, for example, and also encompasses a case where a fitting state of the spectacles gradually becomes worse due to the contours of the face and a case where the fitting state varies instantaneously.

The following describes aspects of the present invention that was made based on the above finding.

A first aspect of the present invention is a method for designing a spectacle lens, including:
when a degree of a change caused by a physical feature of a wearer in at least one of an aberration distribution of an eye of the wearer and an aberration distribution of a spectacle lens worn by the wearer is large, obtaining, as a design solution, a spectacle lens that has an aberration distribution of which rotational asymmetry is weak in a region having a predetermined width and a center at any point on a main meridian of the spectacle lens; and
when the degree of the change is small, obtaining, as a design solution, a spectacle lens of which rotational asymmetry is strong in the region.

A second aspect of the present invention is the method for designing a spectacle lens according to the first aspect,
wherein the physical feature of the wearer is at least any of a degree of left-right asymmetry of the shape of a nose in a front view, a difference between heights of positions on left and right ears on which a spectacle frame is placed, and shape stability of a tear layer of the wearer.

A third aspect of the present invention is the method for designing a spectacle lens according to the first or the second aspect,
wherein when an index that is obtained by quantifying the degree of the change caused by the physical feature of the wearer in at least one of the aberration distribution of the eye and the aberration distribution of the spectacle lens worn by the wearer is represented by Di,
a standard value of Di is represented by Ds, and
an index that is obtained by quantifying rotational asymmetry of an aberration distribution of a spectacle lens is represented by Li,
a spectacle lens of which Li is low is obtained as a design solution when Di is larger than Ds, and
a spectacle lens of which Li is high is obtained as a design solution when Di is not larger than Ds.

A fourth aspect of the present invention is the method for designing a spectacle lens according to the third aspect,
wherein obtaining the spectacle lens as a design solution includes selecting a design solution from a plurality of design solutions that have different values of Li.

A fifth aspect of the present invention is the method for designing a spectacle lens according to the third or the fourth aspect,
wherein, when a degree of a change in an aberration distribution of the eye caused by a change in the shape of a tear layer on a surface of a cornea due to blinking of the wearer is large, a spectacle lens that has an aberration distribution of which rotational asymmetry is weak in the region is obtained as a design solution; and
when the degree of the change in the aberration distribution of the eye caused by the change in the shape of the tear layer on the surface of the cornea due to blinking of the wearer is small, a spectacle lens of which rotational asymmetry is strong in the region is obtained as a design solution.

A sixth aspect of the present invention is the method for designing a spectacle lens according to the fifth aspect,
wherein Di represents an index that is obtained by quantifying at least rotational asymmetry of an aberration distribution of a portion of the cornea corresponding to a pupil of the eye of the wearer, about an optical axis.

A seventh aspect of the present invention is the method for designing a spectacle lens according to the sixth aspect,
wherein when an index that is obtained by quantifying rotational asymmetry regarding an aberration distribution of the eye before blinking of the wearer is represented by Ei and an index that is obtained by quantifying rotational asymmetry regarding an aberration distribution of the eye after blinking of the wearer is represented by Ei',
Di is an index expressed by the following Expression 1, and $$\sum_{m,n} |E_{m,n} - E'_{m,n}| \qquad \text{Expression 1}$$

Li is an index expressed by the following Expression 2, $$\sum_{m,n} mL_{m,n} \qquad \text{Expression 2}$$

wherein E and E' represent polar coordinate expressions of Zernike aberration coefficients of the eye of the wearer, L represents a polar coordinate expression of a Zernike aberration coefficient of the spectacle lens, E relating to the shape of the tear layer on the surface of the cornea before blinking of the wearer, E' relating to the shape of the tear layer on the surface of the cornea after blinking of the wearer, m represents a value indicating an order in a circumferential direction, and n represents a value indicating an order in a radial direction.

An eighth aspect of the present invention is the method for designing a spectacle lens according to any one of the third to seventh aspects,
wherein Ds is determined based on at least one of a standard or average aberration that is obtained statistically or academically with respect to an eye of a spectacle wearer, a degree of turning of the eye of the wearer, a degree of a change in a pupil diameter of the wearer, the age of the wearer, an environment in which the wearer uses spectacles or an intended use of the spectacles for the wearer, and a time elapsed from the last visit of the wearer to an optician's store.

A ninth aspect of the present invention is the method for designing a spectacle lens according to any one of the third to eighth aspects,
wherein a spectacle lens is obtained as a design solution according to a difference between Di and Ds.

A tenth aspect of the present invention is the method for designing a spectacle lens according to any one of the first to ninth aspects,
wherein the spectacle lens is a progressive refractive power lens.

An eleventh aspect of the present invention is a method for manufacturing a spectacle lens that is designed using the method for designing a spectacle lens according to any one of the first to tenth aspects.

A twelfth aspect of the present invention is a system for designing a spectacle lens, including:
a design unit configured to:
obtain, as a design solution, a spectacle lens that has an aberration distribution of which rotational asymmetry is weak in a region having a predetermined width and a center at any point on a main meridian of the spectacle lens, when a degree of a change caused by a physical feature of a wearer in at least one of an aberration distribution of an eye of the wearer and an aberration distribution of a spectacle lens worn by the wearer is large; and obtain, as a design solution, a spectacle lens of which rotational asymmetry is strong in the region, when the degree of the change is small.

A 13th aspect of the present invention is the system for designing a spectacle lens according to the twelfth aspect, wherein the physical feature of the wearer is at least any of a degree of left-right asymmetry of the shape of a nose in a front view, a difference between heights of positions on left and right ears on which a spectacle frame is placed, and shape stability of a tear layer of the wearer.

A 14th aspect of the present invention is the system for designing a spectacle lens according to the twelfth or the 13th aspect,
wherein when an index that is obtained by quantifying the degree of the change caused by the physical feature of the wearer in at least one of the aberration distribution of the eye and the aberration distribution of the spectacle lens worn by the wearer is represented by Di,
a standard value of Di is represented by Ds, and
an index that is obtained by quantifying rotational asymmetry of an aberration distribution of a spectacle lens is represented by Li,
a spectacle lens of which Li is low is obtained as a design solution when Di is larger than Ds, and
a spectacle lens of which Li is high is obtained as a design solution when Di is not larger than Ds.

A 15th aspect of the present invention is the system for designing a spectacle lens according to the 14th aspect,
wherein obtaining the spectacle lens as a design solution includes selecting a design solution from a plurality of design solutions that have different values of Li.

A 16th aspect of the present invention is the system for designing a spectacle lens according to the 14th or the 15th aspect,
wherein, when a degree of a change in an aberration distribution of the eye caused by a change in the shape of a tear layer on a surface of a cornea due to blinking of the wearer is large, a spectacle lens that has an aberration distribution of which rotational asymmetry is weak in the region is obtained as a design solution; and
when the degree of the change in the aberration distribution of the eye caused by the change in the shape of the tear layer on the surface of the cornea due to blinking of the wearer is small, a spectacle lens of which rotational asymmetry is strong in the region is obtained as a design solution.

A 17th aspect of the present invention is the system for designing a spectacle lens according to the 16th aspect,
wherein Di represents an index that is obtained by quantifying at least rotational asymmetry of an aberration distribution of a portion of the cornea corresponding to a pupil of the eye of the wearer, about an optical axis.

An 18th aspect of the present invention is the system for designing a spectacle lens according to the 17th aspect,
wherein when an index that is obtained by quantifying rotational asymmetry regarding an aberration distribution of the eye before blinking of the wearer is represented by Ei and an index that is obtained by quantifying rotational asymmetry regarding an aberration distribution of the eye after blinking of the wearer is represented by Ei',
Di is an index expressed by the following Expression 1, and $$\sum_{m,n} |E_{m,n} - E'_{m,n}| \qquad \text{Expression 1}$$

Li is an index expressed by the following Expression 2, $$\sum_{m,n} m L_{m,n} \qquad \text{Expression 2}$$

wherein E and E' represent polar coordinate expressions of Zernike aberration coefficients of the eye of the wearer, L represents a polar coordinate expression of a Zernike aberration coefficient of the spectacle lens, E relating to the shape of the tear layer on the surface of the cornea before blinking of the wearer, E' relating to the shape of the tear layer on the surface of the cornea after blinking of the wearer, m represents a value indicating an order in a circumferential direction, and n represents a value indicating an order in a radial direction.

A 19th aspect of the present invention is the system for designing a spectacle lens according to any one of the 14th to 18th aspects,
wherein Ds is determined based on at least one of a standard or average aberration that is obtained statistically or academically with respect to an eye of a spectacle wearer, a degree of turning of the eye of the wearer, a degree of a change in a pupil diameter of the wearer, the age of the wearer, an environment in which the wearer uses spectacles or an intended use of the spectacles for the wearer, and a time elapsed from the last visit of the wearer to an optician's store.

A 20th aspect of the present invention is the system for designing a spectacle lens according to any one of the 14th to 19th aspects,
wherein a spectacle lens is obtained as a design solution according to a difference between Di and Ds.

A 21st aspect of the present invention is the system for designing a spectacle lens according to any one of the twelfth to 20th aspects,
wherein the spectacle lens is a progressive refractive power lens.

The following describes other aspects of the present invention that can be combined with the aspects described above.

An amount of aberration for which n=1 can be ignored when determining Di because the aberration is merely caused by a prism and unrelated to resolution.

An amount of aberration, for which |m|=2 and n=2, is an astigmatism amount and can be ignored when determining Di, because the aberration is corrected even in a fixed focal lens and a user has got used to the aberration.

An aspect of the present invention may be applied to a progressive refractive power lens in which transmission astigmatism is added to an intermediate region and a near-vision region, rather than a far-vision region. The aspect of the present invention may be adopted to determine the degree of transmission astigmatism to be added.

According to the present invention, even when at least one of aberration in an eye of a wearer and aberration in a spectacle lens worn by the wearer changes due to a physical feature of the wearer, relative to this change, a change in the amount of aberration is robust when the aberration in the eye and the aberration in the spectacle lens are combined.

BRIEF DESCRIPTION OF THE DRAWINGS

FIG. 1C is a diagram showing a coma aberration distribution (|m|=1, n=3) of the lens 1. FIG. 1D is a diagram showing a Trefoil aberration distribution (|m|=3, n=3) of the lens 1.

FIG. 2C is a diagram showing a coma aberration distribution (|m|=1, n=3) of the lens 2. FIG. 2D is a diagram showing a Trefoil aberration distribution (|m|=3, n=3) of the lens 2.

FIG. 3A is a diagram showing a refractive power distribution (m=0, n=2) of a lens 3. FIG. 3B is a diagram showing an astigmatism distribution (|m|=2, n=2) of the lens 3. FIG. 3C is a diagram showing a coma aberration distribution (|m|=1, n=3) of the lens 3. FIG. 3D is a diagram showing a Trefoil aberration distribution (|m|=3, n=3) of the lens 3.

DETAILED DESCRIPTION OF THE INVENTION

Figure 1A:
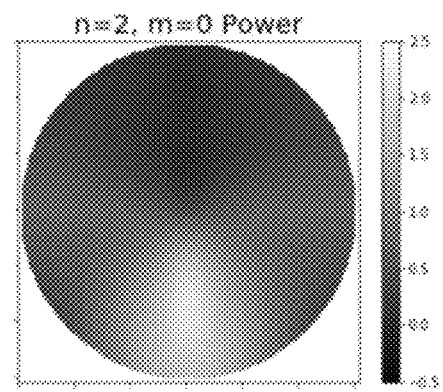
FIG. 1A is a diagram showing a refractive power distribution (m=0, n=2) of a lens 1.

The following describes an aspect of the present invention. In the present specification, "to" between values means "at least a predetermined value and not larger than a predetermined value".

Method for Designing Spectacle Lens

The following is a method for designing a spectacle lens according to an aspect of the present invention.

A method for designing a spectacle lens, including:
when a degree of a change caused by a physical feature of a wearer in at least one of an aberration distribution of an eye of the wearer and an aberration distribution of a spectacle lens worn by the wearer is large, obtaining, as a design solution, a spectacle lens that has an aberration distribution of which rotational asymmetry is weak in a region having a predetermined width and a center at any point on a main meridian of the spectacle lens; and
when the degree of the change is small, obtaining, as a design solution, a spectacle lens of which rotational asymmetry is strong in the region.

An "optical axis" referred to in the present specification corresponds to the normal line at the center of each optical surface.

The "center" described in the above paragraph will also be referred to as a "lens center". The "lens center" means a geometric center, an optical center, or an alignment center of the spectacle lens. In the present specification, the alignment center will be described as an example. In the present specification, a case where a line of sight passes through the lens center when the wearer views straight forward will be described as an example.

As described above, even when the degree of a change caused by a physical feature of the wearer in at least one of the aberration distribution of the eye and the aberration distribution of the spectacle lens worn by the wearer is large, if the above configuration is obtained, a change in the amount of aberration is small (i.e., robust) when aberration in the eye and aberration in the spectacle lens are combined. There is no particular limitation on the type of aberration for which a change in the amount is reduced, but the present disclosure is intended to be applied preferably to a higher order aberration, i.e., a three or higher order aberration.

The "predetermined width" of the region described above is a horizontal width that is smaller than the radius of the lens, and is preferably about 10 mm (for example), and more preferably a width corresponding to a pupil diameter projected to the lens surface. This may be a length on the lens surface corresponding to a pupil diameter of 2 mm (maximum diameter: 5 mm).

"Any point" described above refers to every (suitable) point on the main meridian.

The following describes preferable examples and variations of the method for designing a spectacle lens according to an aspect of the present invention.

The physical feature of the wearer is, for example, at least any of: a degree of left-right asymmetry of the shape of a nose in a front view; a difference between heights of positions on left and right ears on which a spectacle frame is placed; and shape stability of a tear layer of the wearer.

When the degree of left-right asymmetry of the shape of the nose in a front view is high, the following phenomenon may occur. When the spectacles are put on, the spectacles are placed at a right position in a front view. However, as the time passes, the position of the spectacles shifts from the right position about a rotation axis extending in the front-rear direction (optical axis direction) of the wearer, due to the asymmetrical shape of the nose.

When the difference between heights of positions on left and right ears on which the spectacle frame is placed is large, a phenomenon similar to the phenomenon described above may occur. When the spectacles are put on, the spectacles are placed at the right position in a front view. However, as the period of time for which the wearer has worn the spectacles becomes longer, the position of the spectacles shifts over time from the right position about the rotation axis extending in the front-rear direction (optical axis direction) of the wearer, due to the difference between heights of positions on left and right ears on which the spectacle frame is placed.

A case where the shape stability of a tear layer of the wearer is low is the case where the wearer has dry eyes. If the wearer has dry eyes, the shape of the tear layer on the surface of a cornea is unstable. Specifically, there is variation in the thickness of the tear layer on the cornea. Furthermore, the shape of the tear layer on the surface of the cornea easily changes when the wearer blinks. Accordingly, if the wearer has dry eyes, an aberration distribution of the eye significantly changes over time.

In order to facilitate explanation of the content of an aspect of the present invention, the following describes a case where the physical feature refers to whether or not the wearer has dry eyes. In this case, the aspect of the present invention is described as follows.

A method for designing a spectacle lens, including:
when a degree of a change in an aberration distribution of an eye caused by a change in the shape of a tear layer on a surface of a cornea due to blinking of the wearer is large, obtaining, as a design solution, a spectacle lens that has an aberration distribution of which rotational asymmetry is weak in the region; and when the degree of the change in the aberration distribution of the eye caused by the change in the shape of the tear layer on the surface of the cornea due to blinking of the wearer is small, obtaining, as a design solution, a spectacle lens of which rotational asymmetry is strong in the region.

In the following, the "degree of a change in the aberration distribution of the eye caused by a change in the shape of the tear layer on the surface of the cornea due to blinking of the wearer" will be described as an example of the "degree of a change caused by a physical feature of the wearer in at least one of the aberration distribution of the eye and the aberration distribution of the spectacle lens worn by the wearer".

It is preferable to quantify the degree of a change caused by a physical feature of the wearer in at least one of the aberration distribution of the eye and the aberration distribution of the spectacle lens worn by the wearer and rotational asymmetry of the aberration distribution of the spectacle lens. The following describes an example including a quantification process.

Assume that E and L respectively represent polar coordinate expressions of Zernike aberration coefficients of the eye of the wearer and the spectacle lens, m represents a value indicating an order in a circumferential direction, and n represents a value indicating an order in a radial direction. θ represents a turning angle of the eye of the wearer about the optical axis, and y represents a rotation angle of the spectacle lens about the optical axis. At this time, a sum of squares of aberration in the eye and aberration in the spectacle lens is expressed by the following Expression 3.

Expression 3

$$RMS_{total}^2 = \sum_{m,n} \left( E_{m,n}\cos(m\theta_{m,n}) + L_{m,n}\cos(my_{m,n}) \right)^2 + \left( E_{m,n}\sin(m\theta_{m,n}) + L_{m,n}\sin(my_{m,n}) \right)^2$$

$$= \sum_{m,n} \left( E_{m,n}^2 + L_{m,n}^2 + 2E_{m,n}L_{m,n}\cos(\gamma_{m,n} - \theta_{m,n}) \right)$$

The sum of squares is adopted because, due to orthogonality of the Zernike polynomials, they correspond to a sum of squares of all aberrations and correspond to a spot intensity of a spot formed on a retina. In the present specification, a "spot" is a range from a peak to the first dark ring in a distribution of light generated on the retina by light that is emitted from an object point and passed through a portion of the spectacle lens and an ocular optical system. Also, in the present specification, a total energy in this range will be referred to as a "spot intensity".

The following Expression 4 is obtained by partially differentiating the above Expression 3 in terms of each turning angle. The following Expression 4 expresses fluctuation of the sum of squares of aberration in the eye and aberration in the spectacle lens due to turning.

Expression 4

$$dRMS_{total}^2 = \sum_{m,n} 2mE_{m,n}L_{m,n}\sin(m(\gamma_{m,n} - \theta_{m,n}))(d\gamma_{m,n} - d\theta_{m,n})$$

It should be best to design a spectacle lens so as to minimize the fluctuation of the sum of squares expressed by the above Expression 4. On the other hand, it cannot be said to be advantageous to perform calculation of the above expression for each wearer, from the standpoint of calculation time and resources. In the first place, as a matter of course, the direction of a line of sight (eyeball direction) at the time when measurement is performed for a wearer to obtain parameters described above differs from the direction of a line of sight when the wearer wears the spectacle lens in daily life. This diminishes the meaning of minimizing the fluctuation of the sum of squares expressed by the above Expression 4.

Therefore, a parameter relating to the eye and a parameter relating to the spectacle lens are extracted from the above Expression 4. Then, the parameter relating to the eye in Expression 4 is taken to be an index Ei of rotational asymmetry of an aberration distribution of the eye of the wearer about the optical axis. The parameter relating to the spectacle lens in Expression 4 is taken to be an index Li of rotational asymmetry of an aberration distribution of the spectacle lens.

Ei is an index expressed by the following Expression 5.

Expression 5

$$\sum_{m,n} mE_{m,n}$$

Li is an index expressed by the following Expression 2.

Expression 2

$$\sum_{m,n} mL_{m,n}$$

Here, the degree of a change in the aberration distribution of the eye caused by a change in the shape of a tear layer on the surface of the cornea due to blinking of the wearer is quantified based on the following concept.

When an amount of aberration obtained by performing measurement again after the wearer blinks is represented by Ei', the degree of the change is expressed by the following expression.

Expression 1

$$\sum_{m,n} |E_{m,n} - E'_{m,n}|$$

The above Expression 1 is represented by Di (dry eye index).

Note that the method for obtaining Di is merely an example, and there is no limitation on the method for obtaining Di. For example, it is possible to refer to a numerical value that is calculated by a measurement device having a dry eye measurement function and expresses the degree of dry eye. It is also possible to specify a large value for Di if the wearer was diagnosed with dry eye by a doctor.

The following describes a specific example of a customer, who is a subject (who is to be a wearer).

An index obtained by quantifying rotational asymmetry of an aberration distribution about an optical axis in a portion of the cornea corresponding to the pupil of an eye of a wearer A was used as the index Di of rotational asymmetry of the eye of the wearer A. The "portion of the cornea corresponding to the pupil" refers to a portion of the cornea in a range having a diameter of at least 2 mm (maximum diameter: 5 mm) with respect to a pupil center.

A wavefront and aberration in the eye (cornea) can be acquired using methods described in conventional technologies or a known method.

A wavefront and aberration in the spectacle lens can also be acquired using methods described in conventional technologies or a known method. Specifically, for example, interference fringes of light that passed through the spectacle lens from an object side surface of the lens to an eye side surface of the lens can be measured using FUJINON F601, which is a compact laser interferometer manufactured by FUJIFILM Corporation and in which a Fizeau interferometric method is used. After obtaining a measurement result of the interference fringes, data that specifies a wavefront of light that passed through each point on the spectacle lens can be calculated by applying a known fringe analysis algorithm to the measurement result of the interference fringes. A collection of data specifying wavefronts at respective points corresponds to wavefront data of light that passed through the spectacle lens. Accordingly, the wavefront data can be obtained by plotting the data specifying wavefronts at respective points, with respect to the points.

Changes in higher order aberration amounts of the eye of the wearer A are as follows (unit is D (diopter), which will be omitted in the following).

m=2, n=2: astigmatism amount change 0.12 m=1, n=3: coma aberration amount change 0.02 m=3, n=3: Trefoil aberration amount change 0.04 m=2, n=4: higher order astigmatism amount change 0.06 m=4, n=4: Tetrafoil aberration amount change 0.07

As for orders higher than the above orders, changes in aberration amounts were extremely small (<0.001) and therefore are omitted. In the following, the same applies to amounts of aberrations of orders that are not described (in this example, n≥5).

When determining Di, an amount of aberration for which n=1 can be ignored because the aberration is merely caused by a prism and unrelated to resolution.

When determining Di, the amount of aberration, for which m=2 and n=2, is an astigmatism correction component. Unless it is the first time the wearer A has worn a spectacle lens, a previous spectacle lens should have already had the astigmatism correction component. That is, it is expected that the wearer A has got used to the astigmatism correction component. Therefore, it is thought that even if the amount of aberration relating to the astigmatism correction component when aberration in the eye and aberration in the spectacle lens are combined changes, the wearer A is unlikely to feel the change. Therefore, the amount of aberration, for which m=2 and n=2, may be ignored when determining Di. The following describes such an example.

Di (dry eye index) of the wearer A is as follows.

$$Di = 0.02 + 0.04 + 0.06 + 0.07$$
$$= 0.19$$

A standard value of Di is represented by Ds. In this example, an average value of Di of customers of the applicant was adopted as Ds. This is an example, and Ds is not limited to the average value, and it is also possible to adopt an average value or the most frequent value of wearers collected in big data using Internet lines, for example.

Standard values are as follows (unit is omitted).

m=2, n=2: astigmatism amount change 0.10 m=1, n=3: coma aberration amount change 0.07 m=3, n=3: Trefoil aberration amount change 0.02 m=2, n=4: higher order astigmatism amount change 0.03 m=4, n=4: Tetrafoil aberration amount change 0.01

$$Ds = 0.07 + 0.02 + 0.03 + 0.01$$
$$= 0.13$$

Di of the wearer A is larger than the standard value Ds. That is, the degree of the above-described change of the wearer A is higher than the average. According to the method for designing a spectacle lens of the present invention, effects of the present invention are achieved by obtaining a spectacle lens of which Li is low, as a design solution for the wearer A. If Di is not larger than Ds, a spectacle lens of which Li is high is obtained as a design solution.

In an aspect of the present invention, "Li is low" when Di>Ds means that Li is lower than the value of Li when Di≤Ds. That is, "Li is high" and "Li is low" may respectively mean that "higher than the value in the other case" and "lower than the value in the other case". On the other hand, it is also possible to set a standard value Ls of Li similarly to the standard value Ds of Di, and evaluate whether Li is higher or lower than Ls.

Ls may be an average value of Li of customers of the applicant, or an average value or the most frequent value of wearers collected in big data using Internet lines, for example. It is also possible to adopt a design solution of a spectacle lens included in a predetermined product lineup of spectacle lenses, the design solution having the median value of a plurality of values of Li in the lineup.

In the aspect of the present invention, cases are separated according to which of Di>Ds and Di≤Ds applies to each case, but it is also possible to separate cases according to which of Di≤Ds and Di<Ds applies. In this case, a value that is a little smaller than the value of Ds may be set as a new Ds. In any case, Ds is used as the threshold value for separating cases.

"Designing a spectacle lens" as used herein may mean designing an aberration distribution (and a refractive power distribution, which will be omitted hereinafter) of the spectacle lens or correcting an existing aberration distribution, based on the above result (Di>Ds). On the other hand, "designing a spectacle lens" also encompasses a case where a plurality of basic designs (design solutions) of the aberration distribution are prepared, and a design solution is selected from the plurality of basic designs that have different values of Li. In this case, the amount of calculation can be reduced and the cost and time required for designing can be saved.

In the case of a spectacle lens of which Li is low, for example, "obtaining, as a design solution" includes designing the aberration distribution described above, correcting an existing aberration distribution, and selecting a design solution from a plurality of basic designs that have different values of Li. It is also possible to output content of the designed aberration distribution, the corrected aberration distribution, or the selected design solution, as data. This can be said as "outputting data of a spectacle lens of which Li is low, as a design solution", for example.

The above-described configuration of "selecting a spectacle lens" was made based on an idea that is exactly opposite to an idea of conventional technologies. Specifically, conventional technologies focus on the best performance under predetermined envisaged conditions for an eye, but the present invention focuses on the lowest performance under conditions that are not envisaged.

In the present specification, the term "basic design" refers to an aberration distribution before an inset amount in a progressive refractive power lens is considered. That is, when the lens center of the spectacle lens is taken to be the origin, the Y axis corresponds to the main meridian. At this time, the X axis corresponds to the horizontal direction, and the Z axis corresponds to the optical axis direction (forward). Three basic designs that have different values of Li will be described later, and aberration amounts listed for each of the basic designs are aberration amounts in a region having a predetermined width and a center at any point on the main meridian of the spectacle lens. However, aberration amounts of the eye are not added to the aberration amounts listed for the basic designs. As for the above-described region, a width of 10 mm is described above as an example, but the present invention is not limited to this case.

On the other hand, the present invention is not limited to the aspect in which basic designs are aberration distributions before an inset amount is considered, and it is also possible to prepare a plurality of design solutions after setting the main meridian by taking the inset amount into consideration in advance.

Also, the spectacle lens to be designed in the present invention is not limited to a progressive refractive power lens that includes a near-vision region for seeing a near distance, a far-vision region for seeing a distance farther than the near distance, and an intermediate region that connects the near-vision region and the far-vision region and in which the power changes progressively. For example, the spectacle lens may be a spectacle lens (progressive refractive power lens) in which only a near-vision region for seeing a near distance is set and the power changes progressively in the other region of the lens, a bifocal lens, or a fixed focal lens.

In the case of a fixed focal lens, the main meridian is a straight line (e.g., the Y axis) that extends in the vertical (length) direction and passes through an axis of rotational symmetry.

In the case of a progressive refractive power lens (progressive multifocal lens), the main meridian that is set by taking an inset amount into consideration is also called a main gaze line. The main gaze line may be a straight line or a curved line, and is only required to pass through a fitting point FP, a far-vision power measurement reference point F, and a near-vision power measurement reference point N. These positions can be determined based on hidden marks provided on the spectacle lens.

The example in which a design solution is selected from a plurality of basic designs having different values of Li was adopted, and three basic designs were prepared as described below.

FIG. 1A is a diagram showing a refractive power distribution (m=0, n=2) of a lens 1.

Figure 1B:
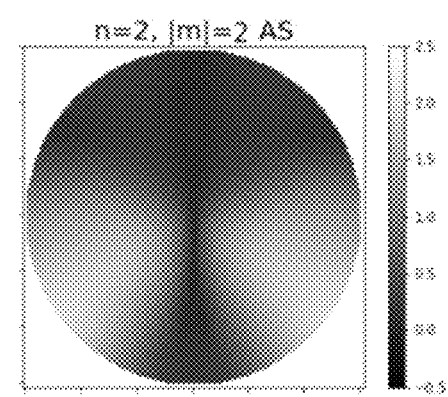
FIG. 1B is a diagram showing an astigmatism distribution (|m|=2, n=2) of the lens 1.

FIG. 1B is a diagram showing an astigmatism distribution (|m|=2, n=2) of the lens 1.

FIG. 1C is a diagram showing a coma aberration distribution (|m|=1, n=3) of the lens 1.

FIG. 1D is a diagram showing a Trefoil aberration distribution (|m|=3, n=3) of the lens 1.

It should be noted that the dimensions are 50 mm×50 mm.

In FIGS. 1A to 3D, white portions are high aberration portions and black portions are low aberration portions. The same applies hereinafter to diagrams showing aberration distributions.

Aberration amounts of the lens 1 are as follows (unit is omitted).

m=2, n=2: astigmatism amount 0.03
m=1, n=1: coma aberration amount 0.35
m=3, n=3: Trefoil aberration amount 0.32

$$Li = 2 \times 0.03 + 1 \times 0.35 + 3 \times 0.32$$
$$= 1.37$$

Figure 2A:
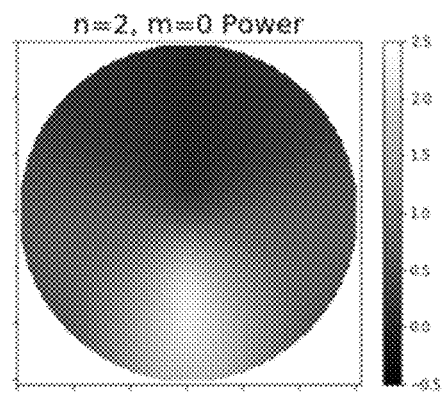
FIG. 2A is a diagram showing a refractive power distribution (m=0, n=2) of a lens 2.

FIG. 2A is a diagram showing a refractive power distribution (m=0, n=2) of a lens 2.

Figure 2B:
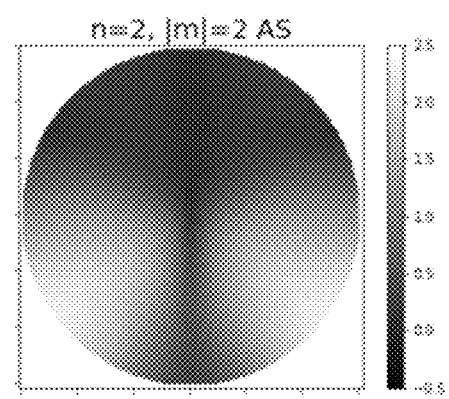
FIG. 2B is a diagram showing an astigmatism distribution (|m|=2, n=2) of the lens 2.

FIG. 2B is a diagram showing an astigmatism distribution (|m|=2, n=2) of the lens 2.

FIG. 2C is a diagram showing a coma aberration distribution (|m|=1, n=3) of the lens 2.

FIG. 2D is a diagram showing a Trefoil aberration distribution (|m|=3, n=3) of the lens 2.

It should be noted that the dimensions are 50 mm×50 mm.

In the lens 2, Trefoil aberration is reduced and astigmatism is increased in an intermediate region on the main meridian of the lens 1. Aberration amounts of the lens 2 are as follows (unit is omitted).

m=2, n=2: astigmatism amount 0.06
m=1, n=1: coma aberration amount 0.38
m=3, n=3: Trefoil aberration amount 0.25

$$Li = 2 \times 0.06 + 1 \times 0.38 + 3 \times 0.25$$
$$= 1.25$$

FIG. 3A is a diagram showing a refractive power distribution (m=0, n=2) of a lens 3.

FIG. 3B is a diagram showing an astigmatism distribution (|m|=2, n=2) of the lens 3.

FIG. 3C is a diagram showing a coma aberration distribution (|m|=1, n=3) of the lens 3.

FIG. 3D is a diagram showing a Trefoil aberration distribution (|m|=3, n=3) of the lens 3.

It should be noted that the dimensions are 50 mm×50 mm.

In the lens 3, Trefoil aberration and astigmatism are increased in the intermediate region on the main meridian of the lens 1. Accordingly, astigmatism is reduced at points that are far from the main meridian. This means that even when a line of sight of the wearer passes through a peripheral portion of the spectacle lens, jitter or distortion of a recognized image is unlikely to occur. Aberration amounts of the lens 3 are as follows (unit is omitted).

m=2, n=2: astigmatism amount 0.06
m=1, n=1: coma aberration amount 0.38
m=3, n=3: Trefoil aberration amount 0.39

$$Li = 2 \times 0.06 + 1 \times 0.38 + 3 \times 0.39$$
$$= 1.67$$

Di of the wearer A is larger than the standard value Ds. Accordingly, it is necessary to obtain a spectacle lens of which Li is low as a design solution for the wearer A. As a result, the lens 2 is selected for the wearer A.

Changes in aberration amounts of an eye of a wearer B are as follows (unit is omitted).

m=2, n=2: astigmatism amount change 0.14
m=1, n=3: coma aberration amount change 0.02
m=3, n=3: Trefoil aberration amount change 0.03
m=2, n=4: higher order astigmatism amount change 0.02
m=4, n=4: Tetrafoil aberration amount change 0.01

Di of the wearer B is as follows.

$$Di = 0.02 + 0.03 + 0.02 + 0.01$$
$$= 0.08$$

Di of the wearer B is smaller than the standard value Ds. Accordingly, it is necessary to obtain a spectacle lens of which Li is high as a design solution for the wearer B. As a result, the lens 3 is selected for the wearer B.

In this example, basic designs of the lenses 1 to 3 are prepared, but it is also possible to select a spectacle lens of which Li is relatively low, from among an existing lineup of spectacle lenses.

The technical scope of the present invention is not limited to the above embodiment, and also includes configurations in which various changes or modifications are made within a scope in which particular effects achieved by constitutional elements of the present invention or a combination of the constitutional elements can be achieved.

In the example described above, the dry eye index is used, but the present invention is not limited to this example. For example, it is possible to determine an index with respect to the degree of left-right asymmetry of the shape of the nose or the difference between heights of positions on left and right ears on which a spectacle frame is placed, similarly to the case of dry eye, and to quantify rotational asymmetry.

In the example described above, Di is defined using only aberration amounts, but another parameter may be added. The parameter is, for example, at least one of a degree of turning of the eye of the wearer, a degree of a change in the pupil diameter of the wearer, the age of the wearer, an environment in which the wearer uses spectacles or an intended use of the spectacles for the wearer, and a time elapsed from the last visit of the wearer to an optician's store.

If the degree of turning of the eye of the wearer and/or the degree of a change in the pupil diameter of the wearer are/is small, a change in the amount of aberration is small when aberration in the eye and aberration in the spectacle lens are combined, and therefore, the value of Di may be reduced according to the degree of turning of the eye.

When the age of the wearer is high, it is highly likely that rotational asymmetry of a wavefront in the eye is strong, and accordingly, the value of Di may be increased according to the age of the wearer.

When the time (period of time) elapsed from the last visit of the wearer to an optician's store is long, it is highly likely that rotational asymmetry of a wavefront in the eye is strong, and accordingly, the value of Di may be increased according to the time.

Furthermore, it is also possible to define Di based on at least one of the age of the wearer and the time elapsed from the last visit of the wearer to an optician's store, rather than defining Di using aberration amounts. This is because the strength of rotational asymmetry of an aberration distribution of the eye of the wearer about the optical axis can be estimated based on these two parameters.

In addition to or in place of Di, Ds may also be defined based on at least one of: a standard or average aberration that is obtained statistically or academically with respect to an eye of a spectacle wearer; a degree of turning of the eye of the wearer; a degree of a change in the pupil diameter of the wearer; the age of the wearer; an environment in which the wearer uses spectacles or an intended use of the spectacles for the wearer; and a time elapsed from the last visit of the wearer to an optician's store. For example, when the age of the wearer is high, it is highly likely that Di is high. In this case, instead of correcting the value of Di, it is also possible to reduce the threshold value, i.e., Ds, which serves as a bar, to make it easy to satisfy Di>Ds and consequently make a lens having a low value of Li more likely to be selected.

A progressive refractive power lens including the far-vision region, the near-vision region, and the intermediate region is described as an example of the spectacle lens. An aspect of the present invention may be applied to a progressive refractive power lens (WO2020/067522, WO2020/067523) in which transmission astigmatism is added to the intermediate region and the near-vision region, rather than the far-vision region, among such progressive refractive power lenses. The aspect of the present invention may be adopted to determine the degree of transmission astigmatism to be added. The entire contents of both documents can be incorporated in the present specification.

Method for Manufacturing Spectacle Lens

The present invention can also be applied to a method for manufacturing a spectacle lens. Specifically, a spectacle lens can be designed in accordance with the method for designing a spectacle lens described above, and the spectacle lens can be manufactured using a known method. Note that a "method for supplying a spectacle lens" may be used as an expression that means at least one of the design method and the manufacturing method described above. Similarly, the following system may also be called a "system for supplying a spectacle lens".

System for Designing Spectacle Lens

The following describes a system for designing a spectacle lens according to an aspect of the present invention. Descriptions of matter that overlaps the matter described in "Method for designing spectacle lens" are omitted.

A System for Designing a Spectacle Lens, Including:

a design unit configured to obtain, as a design solution, a spectacle lens that has an aberration distribution of which rotational asymmetry is weak in a region having a predetermined width and a center at any point on a main meridian of the spectacle lens, when a degree of a change caused by a physical feature of a wearer in at least one of an aberration distribution of an eye of the wearer and an aberration distribution of a spectacle lens worn by the wearer is large; and obtain, as a design solution, a spectacle lens of which rotational asymmetry is strong in the region, when the degree of the change is small.

The system for designing a spectacle lens according to the aspect of the present invention is only required to include the design unit. The design unit may be installed in a computer that executes a predetermined program as necessary.

The system for designing a spectacle lens according to the aspect of the present invention preferably includes the following units in addition to the design unit.

A calculation unit that calculates Di, Li, and the like.

A storage unit that stores a plurality of design solutions having different values of Li (including Li values, other examples include basic designs, design data, etc.), Di of the wearer, Ei and Ei' for determining Di, the standard value Ds, and the like.

An eyeball measurement device for determining Di.

A spectacle lens measurement device for determining Li.

A determination unit that determines which of Di>Ds and Di≤Ds applies.

Figure 4:
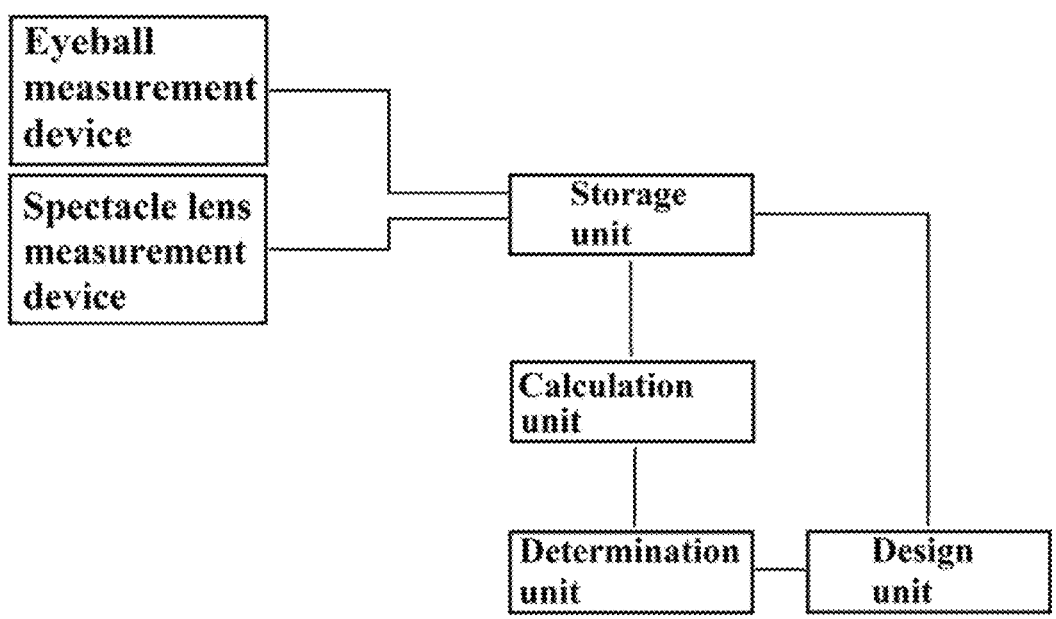
FIG. 4 is a block diagram showing a configuration of a system for designing a spectacle lens according to an aspect of the present invention.

FIG. 4 is a block diagram showing a configuration of the system for designing a spectacle lens according to an aspect of the present invention.

The calculation unit has a function of performing calculations of the above Expressions 1 to 4. The function of the calculation unit can be realized by a unit that executes a predetermined program as necessary in the computer.

The storage unit may store at least any of: a standard or average aberration that is obtained statistically or academically with respect to an eye of a spectacle wearer; a degree of turning of the eye of the wearer; a degree of a change in the pupil diameter of the wearer; the age of the wearer; an environment in which the wearer uses spectacles or an intended use of the spectacles for the wearer; and a time elapsed from the last visit of the wearer to an optician's store, in addition to the plurality of design solutions of lenses, Di, and Ds. The storage unit may be an HDD or the like installed in the computer.

There is no limitation on the eyeball measurement device so long as information for determining Di can be collected. Also, there is no limitation on the spectacle lens measurement device so long as information for determining Li can be collected. For example, it is possible to use FUJINON F601, which is a compact laser interferometer manufactured by FUJIFILM Corporation and in which a Fizeau interferometric method is used, to obtain wavefront data and an aberration distribution.

The calculation unit, the storage unit, the eyeball measurement device, and/or the spectacle lens measurement device do not always have to be installed in the system. For example, the system may be connected to any of these units provided in a network outside the system.

The following describes steps performed using the system.

Figure 5:
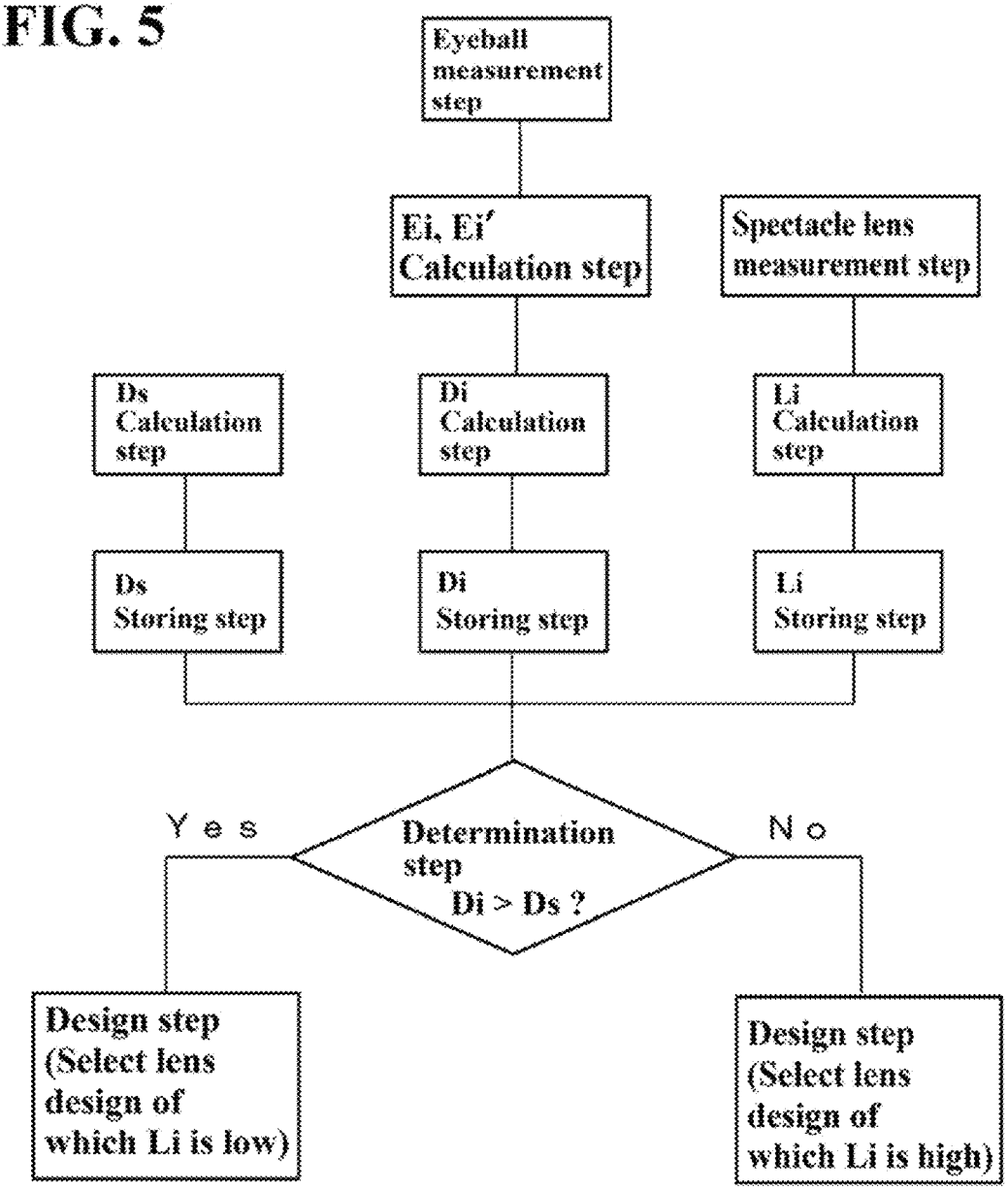
FIG. 5 is a flowchart of the system for designing a spectacle lens according to an aspect of the present invention.

FIG. 5 is a flowchart of the system for designing a spectacle lens according to an aspect of the present invention.

First, an aberration amount is measured using the eyeball measurement device with respect to each set of m and n in a polar coordinate expression of a Zernike aberration coefficient of the subject (who is to be a wearer) (eyeball measurement step). At this time, an aberration amount before blinking and an aberration amount after blinking are measured. Based on the result of measurement, Ei (aberration amount of the eye before blinking) and Ei' (aberration amount of the eye after blinking) are calculated by the calculation unit (Ei calculation step, Ei' calculation step). Based on the result of calculation, Di is calculated (Di calculation step). Di is stored in the storage unit (Di storing step). Of course, Ei and Ei' may be stored in the storage unit.

In an aspect of the present invention, Li1 to Lin of lens design solutions 1 to n (n is an integer of at least 2) that are prepared in advance are obtained (Li preparation step). Li1 to Lin are stored in the storage unit.

Instead of performing the Li preparation step, it is also possible to prepare a plurality of lens design solutions, and measure an aberration amount with respect to each set of m and n in a polar coordinate expression of a Zernike aberration coefficient of each spectacle lens using the spectacle lens measurement device (spectacle lens measurement step). For the sake of convenience of description, the expression "spectacle lens measurement step" is also used for lens design solutions that are prepared before spectacle lenses are actually manufactured. Of course, it is also possible to actually prepare spectacle lenses and measure an aberration amount with respect to each set of m and n in a polar coordinate expression of a Zernike aberration coefficient of each spectacle lens using the spectacle lens measurement device. Based on the result of the spectacle lens measurement step, Li is calculated by the calculation unit (Li calculation step). Li is stored in the storage unit (Li storing step).

A standard value Ds is calculated by the calculation unit using data of wearers stored in the storage unit (Ds calculation step). Ds is stored in the storage unit (Ds storing step).

Then, the determination unit determines which of Di>Ds and Di≤Ds applies. When Di>Ds applies, the design unit selects a design solution of a lens that has a low value of Li among Li1 to Lin (design step). At this time, the design solution may be selected from among Li1 to Lin of the plurality of lens design solutions, according to a difference between Di and Ds. For example, when Di>Ds applies and the difference between Di and Ds is extremely large, a design solution of which Li is the lowest among Li1 to Lin may be selected.

A configuration is also possible in which a standard value Ls is calculated by the calculation unit using the method described as a variation of the aspect of the present invention (Ls calculation step). Ls may be stored in the storage unit (Ls storing step). Then, whether Li is higher or lower than the standard value Ls may be evaluated and Li of a predetermined value may be selected in the design step.

What is claimed is:
1. A method for designing a spectacle lens, comprising:
when a degree of a change caused by a physical feature of a wearer in at least one of an aberration distribution of an eye of the wearer and an aberration distribution of a spectacle lens worn by the wearer is a first amount, obtaining, as a design solution, a spectacle lens that has an aberration distribution of which rotational asymmetry is a first value in a region having a predetermined width and a center at any point on a main meridian of the spectacle lens; and
when the degree of the change is a second amount, smaller than the first amount, obtaining, as a design solution, a spectacle lens of which rotational asymmetry is a second value, larger than the first value, in the region, wherein
an index that is obtained by quantifying the degree of the change caused by the physical feature of the wearer in at least one of the aberration distribution of the eye and the aberration distribution of the spectacle lens worn by the wearer is represented by Di,
a standard value of Di is represented by Ds,
an index that is obtained by quantifying rotational asymmetry of an aberration distribution of a spectacle lens is represented by Li,
a spectacle lens of which Li is the first value is obtained as a design solution when Di is larger than Ds, and a spectacle lens of which Li is the second value is obtained as a design solution when Di is not larger than Ds.

2. The method for designing a spectacle lens according to claim 1,
wherein the physical feature of the wearer is at least any of a degree of left-right asymmetry of the shape of a nose in a front view, a difference between heights of positions on left and right ears on which a spectacle frame is placed, and shape stability of a tear layer of the wearer.

3. The method for designing a spectacle lens according to claim 1,
wherein obtaining the spectacle lens as a design solution includes selecting a design solution from a plurality of design solutions that have different values of Li.

4. The method for designing a spectacle lens according to claim 1,
wherein, when a degree of a change in an aberration distribution of the eye caused by a change in the shape of a tear layer on a surface of a cornea due to blinking of the wearer is a first quantity, a spectacle lens that has an aberration distribution of which rotational asymmetry is the first value in the region is obtained as a design solution; and
when the degree of the change in the aberration distribution of the eye caused by the change in the shape of the tear layer on the surface of the cornea due to blinking of the wearer is a second quantity, smaller than the first quantity, a spectacle lens of which rotational asymmetry is the second value in the region is obtained as a design solution.

5. The method for designing a spectacle lens according to claim 4,
wherein Di represents an index that is obtained by quantifying at least rotational asymmetry of an aberration distribution of a portion of the cornea corresponding to a pupil of the eye of the wearer, about an optical axis.

6. The method for designing a spectacle lens according to claim 5,
wherein when an index that is obtained by quantifying rotational asymmetry regarding an aberration distribution of the eye before blinking of the wearer is represented by Ei and an index that is obtained by quantifying rotational asymmetry regarding an aberration distribution of the eye after blinking of the wearer is represented by Ei',
Di is an index expressed by the following Expression 1, and $$\sum_{m,n} |E_{m,n} - E'_{m,n}|$$ Expression 1

Li is an index expressed by the following Expression 2, $$\sum_{m,n} mL_{m,n}$$ Expression 2 wherein E and E' represent polar coordinate expressions of Zernike aberration coefficients of the eye of the wearer, L represents a polar coordinate expression of a Zernike aberration coefficient of the spectacle lens, E relating to the shape of the tear layer on the surface of the cornea before blinking of the wearer, E' relating to the shape of the tear layer on the surface of the cornea after blinking of the wearer, m represents a value indicating an order in a circumferential direction, and n represents a value indicating an order in a radial direction.

7. The method for designing a spectacle lens according to claim 1,
wherein Ds is determined based on at least one of a standard or average aberration that is obtained statistically or academically with respect to an eye of a spectacle wearer, a degree of turning of the eye of the wearer, a degree of a change in a pupil diameter of the wearer, the age of the wearer, an environment in which the wearer uses spectacles or an intended use of the spectacles for the wearer, and a time elapsed from the last visit of the wearer to an optician's store.

8. The method for designing a spectacle lens according to claim 1,
wherein a spectacle lens is obtained as a design solution according to a difference between Di and Ds.

9. The method for designing a spectacle lens according to claim 1,
wherein the spectacle lens is a progressive refractive power lens.

10. A method for manufacturing a spectacle lens that is designed using the method for designing a spectacle lens according to claim 1.

11. A system for designing a spectacle lens, comprising:
a design unit configured to:
obtain, as a design solution, a spectacle lens that has an aberration distribution of which rotational asymmetry is a first value in a region having a predetermined width and a center at any point on a main meridian of the spectacle lens, when a degree of a change caused by a physical feature of a wearer in at least one of an aberration distribution of an eye of the wearer and an aberration distribution of a spectacle lens worn by the wearer is a first amount; and
obtain, as a design solution, a spectacle lens of which rotational asymmetry is a second value, larger than the first value, in the region, when the degree of the change is a second amount, smaller than the first amount, wherein
an index that is obtained by quantifying the degree of the change caused by the physical feature of the wearer in at least one of the aberration distribution of the eye and the aberration distribution of the spectacle lens worn by the wearer is represented by Di,
a standard value of Di is represented by Ds, and
an index that is obtained by quantifying rotational asymmetry of an aberration distribution of a spectacle lens is represented by Li,
a spectacle lens of which Li is the first value is obtained as a design solution when Di is larger than Ds, and
a spectacle lens of which Li is the second value is obtained as a design solution when Di is not larger than Ds.

12. The system for designing a spectacle lens according to claim 11,
wherein the physical feature of the wearer is at least any of a degree of left-right asymmetry of the shape of a nose in a front view, a difference between heights of positions on left and right ears on which a spectacle frame is placed, and shape stability of a tear layer of the wearer.

13. The system for designing a spectacle lens according to claim 11, wherein obtaining the spectacle lens as a design solution includes selecting a design solution from a plurality of design solutions that have different values of Li.

14. The system for designing a spectacle lens according to claim 11, wherein, when a degree of a change in an aberration distribution of the eye caused by a change in the shape of a tear layer on a surface of a cornea due to blinking of the wearer is a first quantity, a spectacle lens that has an aberration distribution of which rotational asymmetry is the first value in the region is obtained as a design solution; and when the degree of the change in the aberration distribution of the eye caused by the change in the shape of the tear layer on the surface of the cornea due to blinking of the wearer is a second quantity, smaller than the first quantity, a spectacle lens of which rotational asymmetry is the second value in the region is obtained as a design solution.

15. The system for designing a spectacle lens according to claim 14, wherein Di represents an index that is obtained by quantifying at least rotational asymmetry of an aberration distribution of a portion of the cornea corresponding to a pupil of the eye of the wearer, about an optical axis.

16. The system for designing a spectacle lens according to claim 15, wherein when an index that is obtained by quantifying rotational asymmetry regarding an aberration distribution of the eye before blinking of the wearer is represented by Ei and an index that is obtained by quantifying rotational asymmetry regarding an aberration distribution of the eye after blinking of the wearer is represented by Ei', Di is an index expressed by the following Expression 1, and $$\sum_{m,n} |E_{m,n} - E'_{m,n}| \qquad \text{Expression 1}$$

Li is an index expressed by the following Expression 2, $$\sum_{m,n} mL_{m,n} \qquad \text{Expression 2}$$

wherein E and E' represent polar coordinate expressions of Zernike aberration coefficients of the eye of the wearer, L represents a polar coordinate expression of a Zernike aberration coefficient of the spectacle lens, E relating to the shape of the tear layer on the surface of the cornea before blinking of the wearer, E' relating to the shape of the tear layer on the surface of the cornea after blinking of the wearer, m represents a value indicating an order in a circumferential direction, and n represents a value indicating an order in a radial direction.

17. The system for designing a spectacle lens according to claim 11, wherein Ds is determined based on at least one of a standard or average aberration that is obtained statistically or academically with respect to an eye of a spectacle wearer, a degree of turning of the eye of the wearer, a degree of a change in a pupil diameter of the wearer, the age of the wearer, an environment in which the wearer uses spectacles or an intended use of the spectacles for the wearer, and a time elapsed from the last visit of the wearer to an optician's store.

18. The system for designing a spectacle lens according to claim 11, wherein a spectacle lens is obtained as a design solution according to a difference between Di and Ds.

19. The system for designing a spectacle lens according to claim 11, wherein the spectacle lens is a progressive refractive power lens.

* * * * *